(12) United States Patent
Hara (10) Patent No.: US 8,060,778 B2
(45) Date of Patent: Nov. 15, 2011

(54) PROCESSOR CONTROLLER, PROCESSOR CONTROL METHOD, STORAGE MEDIUM, AND EXTERNAL CONTROLLER

(75) Inventor: Michiharu Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 219 days.

(21) Appl. No.: 12/198,927

(22) Filed: Aug. 27, 2008

(65) Prior Publication Data

US 2009/0049336 A1     Feb. 19, 2009

Related U.S. Application Data

(63) Continuation of application No. PCT/JP2006/303771, filed on Feb. 28, 2006.

(51) Int. Cl.
*G06F 11/00* (2006.01)
(52) U.S. Cl. ......................................................... 714/10
(58) Field of Classification Search ................ 714/8–12, 714/23–26, 30, 31, 39, 43, 47, 48
See application file for complete search history.

(56) References Cited

U.S. PATENT DOCUMENTS

| | | | | |
|---|---|---|---|---|
| 4,486,826 A | * | 12/1984 | Wolff et al. | 714/9 |
| 5,157,667 A | * | 10/1992 | Carusone et al. | 714/45 |
| 5,230,046 A | * | 7/1993 | Iwata et al. | 714/2 |
| 6,574,752 B1 | * | 6/2003 | Ahrens et al. | 714/43 |
| 6,868,479 B1 | * | 3/2005 | Thibault et al. | 711/114 |
| 2002/0184576 A1 | * | 12/2002 | Arndt et al. | 714/48 |
| 2004/0216026 A1 | * | 10/2004 | Ferraiolo et al. | 714/758 |

FOREIGN PATENT DOCUMENTS

| | | |
|---|---|---|
| JP | 1-295338 | 11/1989 |
| JP | 7-19211 | 3/1995 |
| JP | 10-105527 | 4/1998 |
| JP | 2000-322397 | 11/2000 |
| JP | 2001-175489 | 6/2001 |
| JP | 2002-229811 | 8/2002 |

OTHER PUBLICATIONS

Japanese Office Action mailed May 18, 2010 in corresponding Japanese Patent Application 2008-502593.
International Preliminary Report on Patentability dated Sep. 2, 2008 in corresponding PCT Application No. PCT/JP2006/303771 (6 pp).
International Search Report dated May 11, 2006 in corresponding International Application PCT/JP2006/303771 (1 pg).

* cited by examiner

*Primary Examiner* — Nadeem Iqbal
(74) *Attorney, Agent, or Firm* — Fujitsu Patent Center (57) ABSTRACT

A processor having a plurality of hardware resources can perform separate controls within a proper range according to the dependent relations of hardware resources troubled. In case a notification is made of the failure of the hardware resources constituting the processor, a processor control method decides the range of the hardware resources, which cannot be used because of that failure, as a failure range, on the basis of the dependencies of the individual hardware resources predetermined, and stops the use of the hardware resources of the failure range on the basis of that decision result. When the use of the hardware resources indicated by the failure range is stopped, the hardware is not stopped before a predetermined operation is performed not to affect the instruction processing procedure outside of the failure range.

17 Claims, 9 Drawing Sheets

| ERROR INPUT | | | | | FAULT RANGE OUTPUT | | | | | |
|---|---|---|---|---|---|---|---|---|---|---|
| Fatal_ERR | Module_ERR | Core0_ERR | Core1_ERR | Fatal | C0S0_HW_ERR | C0S1_HW_ERR | C1S0_HW_ERR | C1S1_HW_ERR | | |
| 1 | - | - | - | 1 | 1 | 1 | 1 | 1 | | |
| 0 | 1 | - | - | 0 | 1 | 1 | 1 | 1 | | |
| 0 | 0 | 0 | 0 | 0 | C0S0_ERR | C0S1_ERR | C1S0_ERR | C1S1_ERR | | |
| 0 | 0 | 0 | 1 | 0 | C0S0_ERR | C0S1_ERR | 1 | C1S1_ERR | | |
| 0 | 0 | 1 | 0 | 0 | 1 | 1 | C1S0_ERR | C1S1_ERR | | |
| 0 | 0 | 1 | 1 | 0 | 1 | 1 | 1 | 1 | | |

FIG. 3

| STOP-OF-USE INPUT | | | | STOP-OF-USE CONTROL SIGNAL | | | | | |
|---|---|---|---|---|---|---|---|---|---|
| C0S0_STOP | C0S1_STOP | C1S0_STOP | C1S1_STOP | C0S0_DG | C0S1_DG | C1S0_DG | C1S1_DG | Core0_DG | Core1_DG |
| 0 | 0 | 0 | 1 | 0 | 0 | 0 | 1 | 0 | 0 |
| 0 | 0 | 1 | 0 | 0 | 0 | 1 | 0 | 0 | 0 |
| 0 | 0 | 1 | 1 | 0 | 0 | 1 | 1 | 0 | 1 |
| 0 | 1 | 0 | 0 | 0 | 1 | 0 | 0 | 0 | 0 |
| 0 | 1 | 0 | 1 | 0 | 1 | 0 | 1 | 0 | 0 |
| 0 | 1 | 1 | 0 | 0 | 1 | 1 | 0 | 0 | 0 |
| 0 | 1 | 1 | 1 | 0 | 1 | 1 | 1 | 0 | 1 |
| 1 | 0 | 0 | 0 | 1 | 0 | 0 | 0 | 0 | 0 |
| 1 | 0 | 0 | 1 | 1 | 0 | 0 | 1 | 0 | 0 |
| 1 | 0 | 1 | 0 | 1 | 0 | 1 | 0 | 0 | 0 |
| 1 | 0 | 1 | 1 | 1 | 0 | 1 | 1 | 0 | 1 |
| 1 | 1 | 0 | 0 | 1 | 1 | 0 | 0 | 1 | 0 |
| 1 | 1 | 0 | 1 | 1 | 1 | 0 | 1 | 1 | 0 |
| 1 | 1 | 1 | 0 | 1 | 1 | 1 | 0 | 1 | 0 |
| 1 | 1 | 1 | 1 | 1 | 1 | 1 | 1 | 1 | 1 |

PROCESSOR CONTROLLER, PROCESSOR CONTROL METHOD, STORAGE MEDIUM, AND EXTERNAL CONTROLLER

CROSS-REFERENCE TO RELATED APPLICATION

This is a continuation of Application PCT/JP2006/303771, filed on Feb. 28, 2006, now pending, the contents of which are herein wholly incorporated by reference.

BACKGROUND

The present invention relates to control of separating an error portion in processors capable of simultaneously executing instruction processing procedures.

In the present field of processors, a multi-core processor implementing a plurality of cores within a single processor in order to improve a throughput and a processor capable of simultaneously executing a plurality of threads by the single core, are on the way of becoming a mainstream at the present.

Further, the high-end server is employed for an operation that is not permitted to stop in many cases, and is, if a fault occurs, required to resume the operation by quickly separating the fault-occurred element.

Moreover, there are an increased number of high-end servers which include a system controller dedicated to controlling and monitoring the whole system in many cases, and the processor is equipped with a command/interface etc as an extended version of a JTAG (Join Test Action Group) interface for the IEEE 1149.1 standard entitled Standard so that an interrupt signal to the system controller can be controlled from within the system controller.

In a conventional error process, if an error occurs in the hardware, the software (OS) is notified of the occurrence of the error through high-level interrupt, and the OS switches over to an error processing routine from the normal process. The OS executes a so-called separating process (degenerating process) of specifying the fault-occurred element by repeating an access to the hardware, setting a flag showing the fault-occurred element and disabling the fault-occurred element from being used.

SUMMARY

In the conventional error process, the fault-occurred hardware itself executes the error processing routine, and therefore, in the case of employing the fault-occurred element for this error process, this process itself causes an error, resulting in a software loop with repetition of the error process.

For this reason, a processor executing the degenerating process in such a way that the processor itself specifies a range (influence range) where inconvenience occurs due to influence of the error, reduces a possibility that it is difficult to specify the influence range due to the error in the processor itself and it is difficult to execute the degenerating process.

Especially, as described above, in the processor having the multi-core architecture and a multi-strand architecture, it is irrational to stop the whole system when the error occurs in the part of the cores and in the part of the strands, and it is therefore desirable that the degenerating process is carried out by specifying the influence element with high accuracy.

The present disclosed processor controller includes the following means in order to solve the problems given above.

Namely, a processor controller according to the present invention comprises: fault range determining means (unit) determining as a fault range, when receiving notification showing a fault of a hardware resource in a plurality of hardware resources building up a processor, a range of the hardware resources disabled from being used due to the fault on the basis of a predetermined dependent relation between the hardware resources; and stop-of-use means (unit) stopping the use of the hardware resources in the fault range on the basis of a result of the determination.

The processor controller may further comprise means (unit) executing, when stopping the use of the hardware resources specified by the fault range, a predetermined process so as not to affect an instruction processing procedure beyond the fault range and thereafter stopping the hardware resources.

In the processor controller, if a cache memory in a write-back system is included in the fault range, a process of writing a content of the cache memory to a cache memory or a memory existing beyond the fault range may be executed as the predetermined process.

The processor controller may further comprise means (unit) stopping, when the hardware resources operate based on clocks, the clocks supplied to the hardware resources in accordance with the notification given from the stop-of-use means.

The processor controller may further comprise means (unit) retaining stop information specifying the hardware resources taking a stop-of-use status at the present, wherein the stop-of-use means may determine the hardware resource of which the use is stopped afresh from the present stop information and a newly-received fault range.

In the processor controller, a core defined as the hardware resource may have a plurality of strands defined as the hardware resources, and, if a part of the core is in the stop-of-use status at the present and when the fault range determining means newly determines that all other parts of the core fall within the fault range, the stop-of-use means may stop the core on the basis of the present stop information and the new fault range.

The fault range determining means may notify an external controller of the fault range, and the stop-of-use means may receive the fault range from the external controller.

The stop-of-use means may receive the fault range from the external controller when in a startup process, and may stop the use of the hardware resources in the fault range.

The hardware resources may be cache memories, if contents of the cache memories do not take consistency due to a fault, the fault range determining unit may determine all the range of the processor to be the fault range, and the stop-of-use means may stop all of the hardware resources.

Further, according to the present invention, a processor control method by which a processor controller executes: a step of determining as a fault range, when receiving notification showing a fault of a hardware resource in a plurality of hardware resources building up a processor, a range of said hardware resources disabled from being used due to the fault on the basis of a predetermined dependent relation between said hardware resources; and a step of stopping the use of said hardware resources in the fault range on the basis of a result of the determination.

In the processor control method, when stopping the use of the hardware resources specified by the fault range, a predetermined process may be executed so as not to affect an instruction processing procedure beyond the fault range, and thereafter the hardware resources may be stopped.

In the processor control method, if a cache memory in a write-back system is included in the fault range, a process of writing a content of the cache memory to a cache memory or a main memory existing beyond the fault range may be executed as the predetermined process.

In the processor control method, when the hardware resources operate based on clocks, on the occasion of stopping the use of the hardware resources, the clocks supplied to the hardware resources may be stopped.

In the processor control method, the processor controller may execute a step of retaining stop information specifying the hardware resources taking a stop-of-use status at the present, and, on the occasion of stopping the use of the hardware resources, the hardware resource of which the use is stopped may be determined afresh from the present stop information and a newly-received fault range.

In the processor control method, a core defined as the hardware resource has a plurality of strands defined as the hardware resources, and, if a part of the core is in the stop-of-use status at the present and when newly determining that all other parts of the core fall within the fault range, the core may be stopped based on the present stop information and the new fault range.

In the processor control method, on the occasion of determining the fault range, an external controller may be notified of the fault range, and on the occasion of stopping the use of the hardware resources, the fault range may be received from the external controller.

In the processor control method, the fault range may be received from the external controller when in a startup process of the processor controller, and the use of the hardware resources in the fault range may be stopped.

In the processor control method, the hardware resources may be cache memories, and, if contents of the cache memories do not take consistency due to a fault, all of the hardware resources may be stopped.

Further, the present invention may also be a processor comprising the processor controller described above.

Still further, the present invention may be a program for making the processor controller execute the processor control method.

Yet further, an external controller according to the present invention is connected to a processor controller comprising: fault range determining means determining as a fault range, when receiving notification showing a fault of a hardware resource in a plurality of hardware resources building up a processor, a range of the hardware resources disabled from being used due to the fault on the basis of a predetermined dependent relation between the hardware resources; and stop-of-use means stopping the use of the hardware resources in the fault range on the basis of a result of the determination, the external controller comprising: means receiving the fault range from the fault range determining means; and means transmitting the fault range as a stop-of-use request to the stop-of-use means.

The external controller may further comprise means (unit) stored with the fault range and transmitting the fault range as the stop-of-use request to the stop-of-use means when restarted.

The present disclosed technology enables the processor including the plurality of hardware resources to perform the control of separating the fault-occurred hardware resource in a proper range corresponding to dependent relations between the hardware resources.

DETAILED DESCRIPTION

A best mode for carrying out the present invention will hereinafter be described with reference to the drawings. A configuration in the following embodiment is an exemplification, and the present invention is not limited to the configuration in the embodiment.

§1. Whole Configuration

The present embodiment exemplifies a scheme that a single processor includes a plurality of core units, a plurality of strands can be simultaneously executed per core, the core is equipped with a cache memory taking a write-back system, and the cache memory is shared among the strands within the core. Incidentally, FIG. 1 illustrates only one processor 1, however, a system according to the present embodiment includes a plurality of processors 1.

Figure 1:
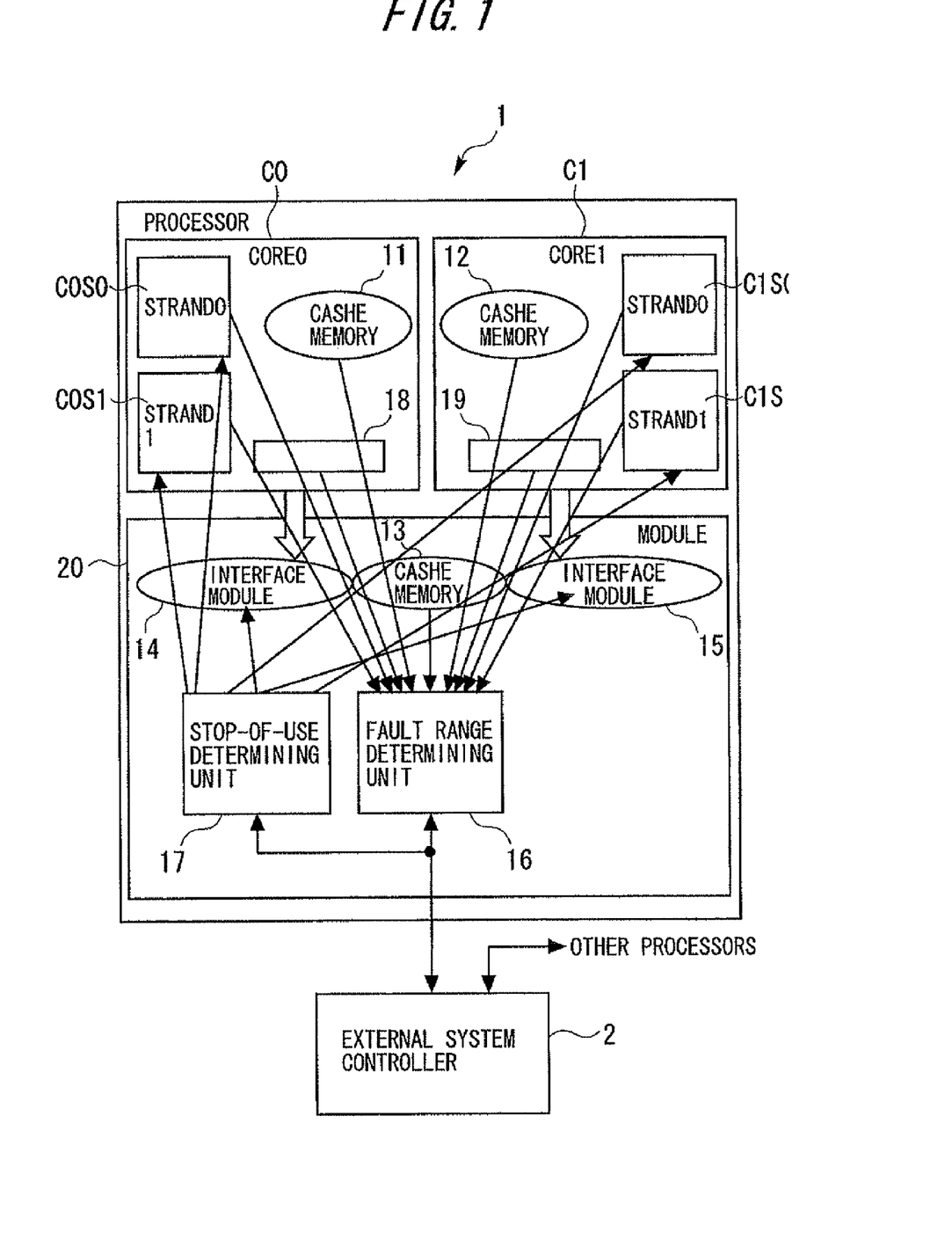
FIG. 1 is a diagram showing an architecture of a whole system according to the present invention.

FIG. 1 is a diagram showing an architecture of the whole system according to the present embodiment.

The processor 1 includes two cores C0, C1, and a module common unit 20. The core C0 has strand modules C0S0, C0S1 used exclusively in the respective strands, and a cache memory 11 employed in common by the strand modules C0S0, C0S1 within code, Similarly, the core C1 has strand modules C1S0, C1S1 used exclusively in the respective strands, and a cache memory 12 employed in common by the strand modules C1S0, C1S1 within code. Note that the strand modules C0S0, C0S1, C1S0, C1S1, are registers etc such as program counters.

Further, the processor 1 includes core common units 18, 19 used in common between the strands within the same core, and a module common unit 20 employed in common among the whole strands within the processor.

The module common unit 20 has a fault range determining unit 16 that retains a fault range on a strand-by-strand basis from an input of an error of which each hardware resource notifies, a stop-of-use determining unit 17 that determines a hardware area of which the use is stopped in response to a stop-of-use request given on the strand-by-strand basis and outputs a stop-of-use control signal, a cache memory 13 employed in common between the cores C0, C1, and interface modules 14, interfacing with the cores C0, C1 for communications.

Moreover, the fault range determining unit 16 and the stop-of-use determining unit 17 are connected to an external system processor (corresponding to an external controller) 2.

The hardware resources of the processor 1 are the cores C0, C1, the module common unit 20, the strand modules C0S0, C0S1, C1S0, C1S1, the cache memories 11, 12, 13, the interface modules 14, 15, the fault range determining unit 16, the stop-of-use determining unit 17, the core common units 18, 19, etc.

The fault range determining unit 16, when receiving the fault notification from the hardware resource, determines based on a predetermined relation of how the individual hardware resources depend on each other, a range of the hardware resource disabled from being used due to the fault as a fault range. The dependent relation represents a corresponding relation between the fault-occurred hardware resources and the hardware resources disabled from being used due to the fault such as [if the cache memory 11 malfunctions, the strand modules C0S0, C0S1 using the cache memory 11 get unusable.], and [if the core common unit 19 malfunctions, the core C1 gets unusable.].

Figure 2:
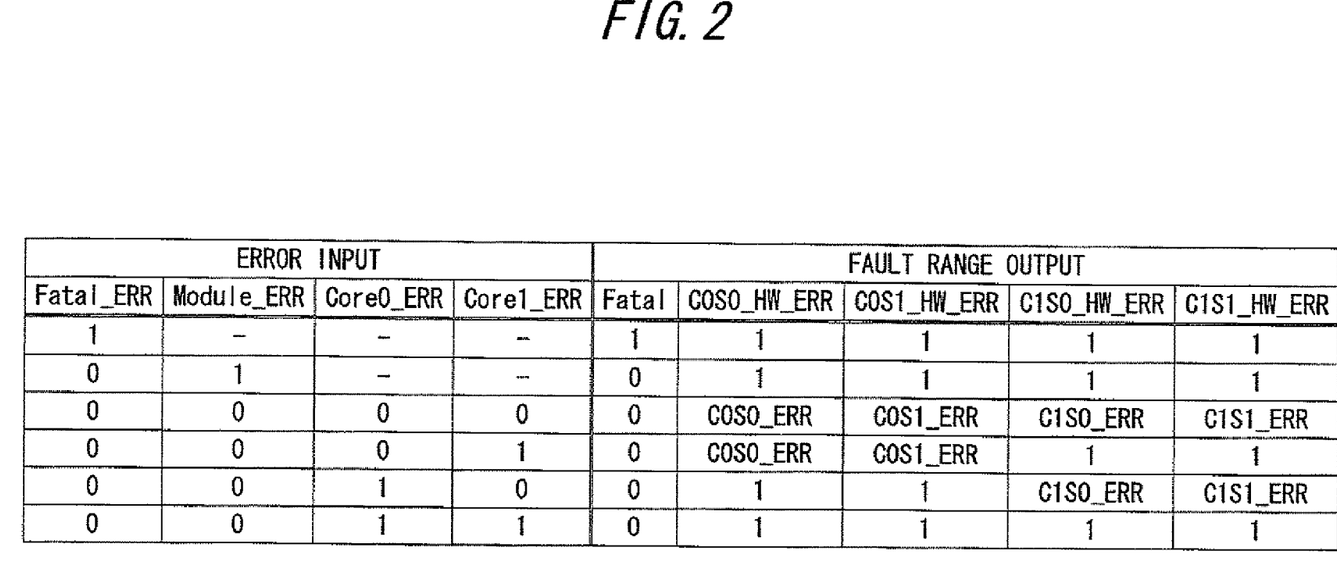
FIG. 2 is a diagram showing a relation between an error input and a fault range output in a fault range determining unit.

To be specific, as illustrated in FIG. 2, the fault range determining unit according to the present embodiment is, when receiving an error input from each hardware resource, a register having logic for outputting a bit string showing a fault range.

FIG. 2 illustrates part of a relation between the error input and the output of the fault range in the fault range determining unit 16. The fault range determining unit 16, in the case of receiving the error inputs from the respective hardware resources, receives the error inputs (fault inputs) such as Fatal_ERR from the cache memories 11, 12, 13, Module_ERR from the module common unit 20, Core0_ERR from the core common unit 18 and Core1_ERR from the core common unit 19. Note that "1" represents a fault, "0" indicates a normal state, "-" shows "1" or "0" in FIG. 2. Further, the fault range determining unit 16 outputs, in response to the error inputs, fault range outputs such as "Fatal, C0S0_HW_ERR, C0S1_HW_ERR, C1S0_HW_ERR and C1S1_HW_ERR". Incidentally, in FIG. 2, C0S0_HW_ERR represents the strand C0S0, C0S1_HW_ERR is the strand C0S1, C1S0_HW_ERR is the strand C1S0, and C1S1_HW_ERR is the strand C1S1, wherein when "1" is given, this is a case of stopping the use, and when "0" is given, this is a usable case. Herein, in the case of C0S0_ERR, C0S1_ERR, C1S0_ERR and C1S1_ERR, according to the error inputs from the strands C0S0, C0S1, C1S0 and C0S1, when receiving "0", this is the usable case, and when receiving "1", this is the case of stopping the use.

Namely, if all of C0S0_HW_ERR, C0S1_HW_ERR, C1S0_HW_ERR and C1S1_HW_ERR are "0" which means the usable case, the strand modules C0S0, C0S1, C1S0, C1S1 conform to the inputs such as C0S0_ERR, C0S1_ERR, C0S0_ERR and C0S1_ERR. For example, if the strand C0S0 gets into the fault, "1" is set in the input C0S0_ERR, "1" is set in the output C0S0_HW_ERR, and "0" is set in other outputs, thus stopping the use of only the strand C0S0. The use of strand modules C0S1, C1S0, C1S1 is individually stopped in the same way.

Moreover, if the core common unit 19 malfunctions, the input "1" is set in Core1_ERR, and the input "0" is set others, in which case "1" is set in C1S0_ERR, C1S1_ERR in order to stop both of the strands C1S0, C1S1 of the core 1, and the strands C0S0, C0S1 of the core 0 conform to the respective inputs C0S0_ERR, C0S1_ERR. With this scheme, if the fault occurs in the strand core common unit 19 used in common between the strands C1S0, C1S1, the use of the strands C1S0, C1S1 is stopped irrespective of the statuses of the strands C1S0, C1S1.

Similarly, if the core common unit 18 malfunctions, the input "1" is set in Core0_ERR, and the input "0" is set in others, in which case "1" is set in C0S0_ERR, C0S1_ERR in order to stop both of the strands C0S0, C0S1 of the core 0, and the strands C1S0, C1S1 of the core 1 conform to the respective inputs C1S0_ERR, C1S1_ERR.

Accordingly, if both of the core common units 18, 19 undergo the malfunction and if the input "1" is set in Core0_ERR and Core1_ERR, the use of the strands C0S0, C0S1, C1S0 and C1S1 is stopped.

Further, if the common module 20 employed in common among the strand modules C0S0, C0S1, C1S0, C1S1 comes into the fault, the input "1" is set in Module_ERR, and the input "0" is set in Fatal, in which case the use of the strands C0S0, C0S1, C1S0 and C1S1 is stopped regardless of the values in Core0_ERR and Core1_ERR.

Thus, on the occasion of stopping the use of the hardware resource embraced by the fault range, after executing a predetermined process so as not to exert influence on an instruction processing procedure beyond the fault range, the hardware is stopped. For example, when the value in Fatal_ERR representing occurrence of the error (fault) making it difficult to keep cache memory coherence with respect to the respective hardware resources comes to "1", the output "1" is set in Fatal, thus stopping the use of all pieces of hardware (all of the strands in the present embodiment) within the same processor. The external system controller 2, when the output "1" from the fault range determining unit 16 is set in Fatal, temporarily stops the processing of the whole system, then degenerates the fault-occurred processor 1, restarts the system in a status enabling the cache memory coherence to be maintained, and resumes the processing of other processors. Incidentally, the scheme of the present embodiment is that the use of the whole processor with "1" set in Fatal_ERR is stopped when restarted, and hence the fault range determining unit 16 forcibly sets "1" with respect to all of the strands when "1" is set in Fatal_ERR, however, another possible implementation is that the use of only the strands using the fault-occurred hardware resource is stopped without any compulsion.

Note that the fault range determining unit (fault range register) 16 is enabled to be reset on a bit-by-bit basis from the external system controller 2, obtains an output by ORing all of bits of the fault range register, further obtains a signal by ANDing the ORed output with an output of an interruption mask register controllable from the external system controller and uses this signal for interruption of the external system controller. Through this operation, the integration about the fault-occurred elements is carried out.

Further, the stop-of-use determining unit (stop-of-use means) 17 stops, based on a result of the determination by the fault range determining unit 16, the use of the hardware resource within the fault range. In the present embodiment, the fault range determining unit 16 notifies the external system processor 2 of a fault range output, and the external system processor 2 notifies the stop-of-use determining unit 17 of the fault range (a stop-of-use request).

Figure 3:
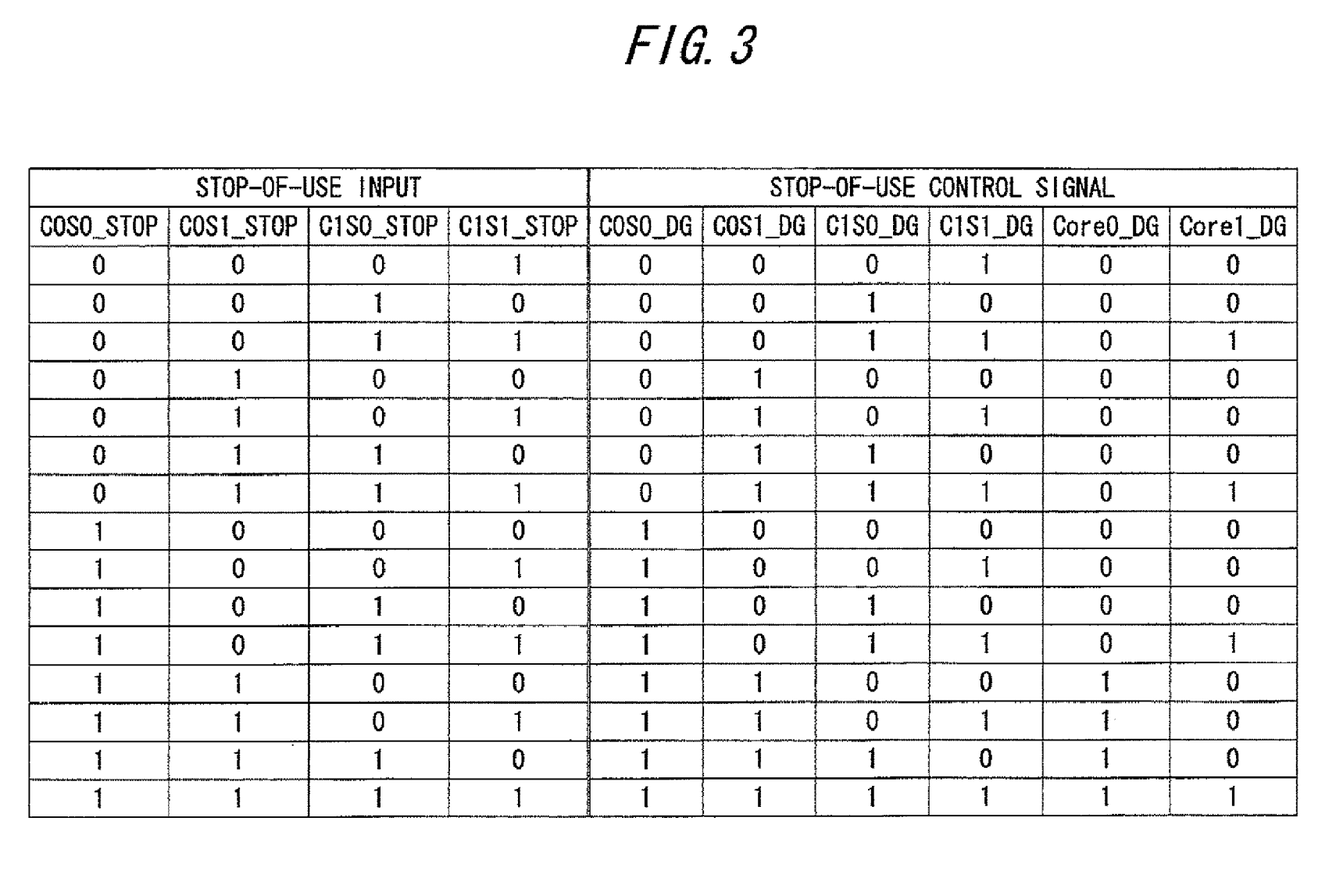
FIG. 3 is a diagram showing a relation between a stop-of-use input and a stop-of-use control signal in a stop-of-use determining unit.

FIG. 3 shows a relation between a stop-of-use input and a stop-of-use control signal in the stop-of-use determining unit. In FIG. 3, stop-of-use inputs C0S0_STOP, C0S1—STOP, C1S0_STOP and C1S1_STOP are defined as signals respectively showing whether the use of the strands C0S0, C0S1, C1S0 and C1S1 stopped or not. Note that "0" represents the usable case, while "1" denotes the stop-of-use case. Further, stop-of-use control signals C0S0_DG, C0S1_DG, C1S0_DG, C1S1_DG, Core0_DG and Core1_DG are signals showing whether the use of the strands C0S0, C0S1, C1S0 and C1S1 and the use of the cores Core0 and Core1 are stopped or not. Note that "0" represents the usable case, while "1" denotes the stop-of-use case. Namely, each strand, when "1" is set in the stop-of-use control signal "CxSx_DG" corresponding thereto, stops processing.

Figure 6:
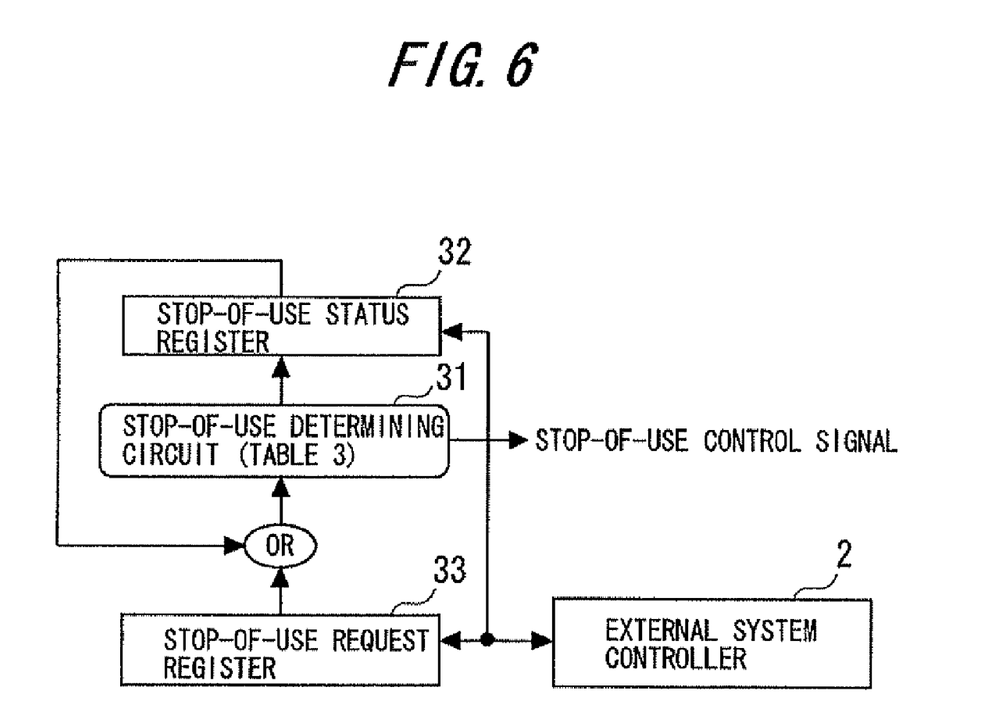
FIG. 6 is a block diagram of the stop-of-use determining unit.

The stop-of-use determining unit 17 includes, as shown in FIG. 6, a stop-of-use request register 33 receiving the stop-of-use request on the strand-by-strand basis from the external system processor 2, and a stop-of-use status register 32 that retains the present stop-of-use status on the strand-by-strand basis. Then, a stop-of-use determining circuit of the stop-of-use determining unit 17 sets, as the stop-of-use input, a ORed-value per bit in the stop-of-use request register 33 and the stop-of-use status register 32, and outputs the stop-of-use control signal according to the table in FIG. 3.

Next, in the cores C0, C1 of which all of the intra-core strands are not in the stop-of-use status, "1" is set in the stop-of-use control signal "Corex_DG" with respect to the core Cx, which indicates a case of newly giving an instruction to stop using the core Cx. This case involves starting forcibly rewriting a content of the cache memory 11 or 12 of the core Cx to the memory (e.g., the cache memory 13) and, after the rewriting process has been normally completed, updating a content of the stop-of-use status register 32 with an ORed value per bit in the stop-of-use request register 33 and the stop-of-use status register 32, and thereafter invalidating the interface signals with the core Cx of which the use is stopped by the interface modules 14, 15 of the module common unit 20.

A case other than those given above involves only updating the stop-of-use status register 32 with the ORed value per bit in the stop-of-use request register 33 and the stop-of-use status register 32.

Moreover, the external system processor 2 is an information processor for the system management, which includes a CPU, a main memory, etc, and performs monitoring a temperature, resetting each processor and executing a process related to a system console.

The external system controller 2, after making a stop-of-use request, checks whether the stop-of-use request is normally terminated in a way that reads and checks the content of the stop-of-use status register 32.

Further, the external system controller 2 is cumulatively stored with the contents of the fault range register 16, and, when executing a POR (Power On Reset) process and a restart process, those contents are reset in the fault range register 16 of each processor 1.

Figure 4A:
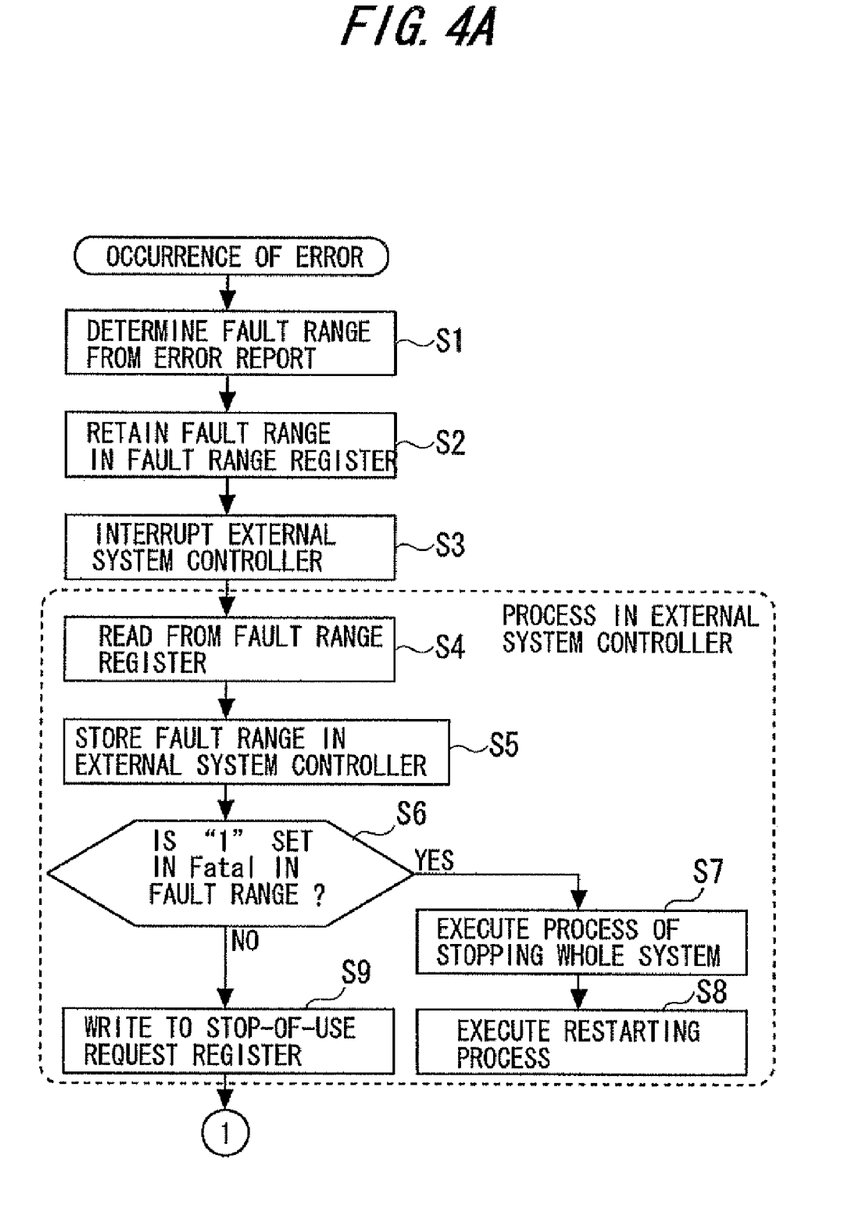
FIG. 4A-4C are a diagram showing a flow of a degenerating process.
Figure 4B:
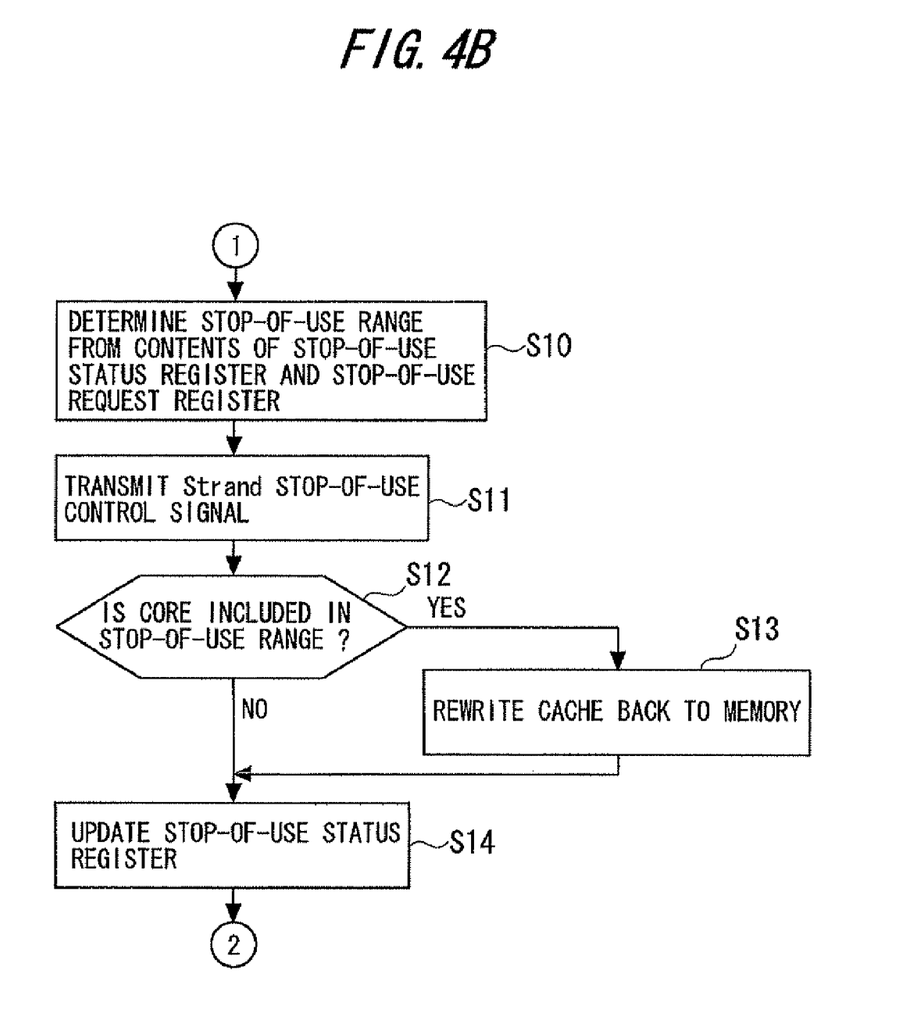
Figure 4C:
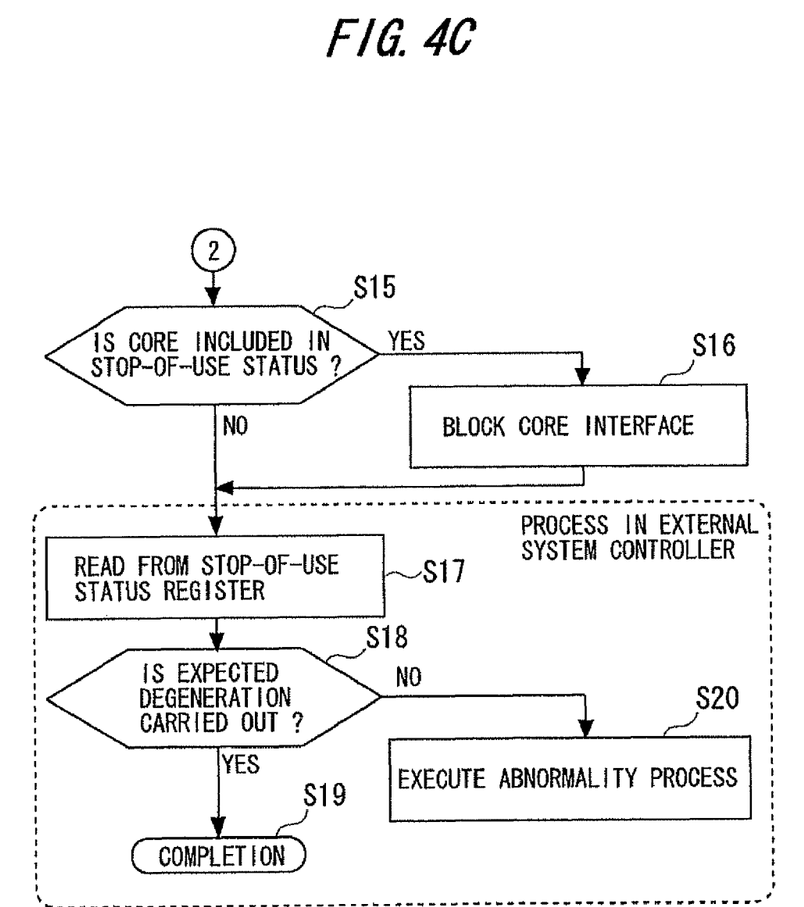

FIGS. 4A-4C are flowcharts of a degenerating process in the system having the architecture described above.

As shown in FIGS. 4A-4C, if the error (fault) occurs and when each hardware resource issues an error report, the fault range determining unit 16 determines a fault range from the error report (S1). The fault range determining unit 16 retains the determined fault range in the fault range register (S2), and interrupts the external system controller 2 (S3).

The external system controller 2 reads the fault range from the fault range register (S4), and stores the fault range in the main memory within the controller (S5). Then, the external system controller 2 determines whether "1" is set in Fatal in the fault range or not (S6), executes the process of stopping the whole system when "1" is set in Fatal (S7), and executes the restart process (S8).

Whereas if "1" is not set in Fatal, the external system controller 2 writes the stop-of-use request to the stop-of-use request register 33 (S9).

The stop-of-use determining unit 17 determines the stop-of-use rage from the content of the stop-of-use request register and the content of the stop-of-use status register (S19). Then, the stop-of-use determining unit 17 transmits the stop-of-use control signal with respect to the strand CxSx in the stop-of-use range (S11).

Further, the stop-of-use determining unit 17 determines whether the stop-of-use range includes the core Cx or not, and, if included, rewrites the content of the cache memory 11 or 12 of the core Cx, which is stopped, to the main memory (S13).

After being rewritten, or if the stop-of-use range does not include the core Cx in step 12, the stop-of-use determining unit 17 updates the content of the stop-of-use status register with a result of the determination made by the stop-of-use determining circuit 31 (S14).

Moreover, it is determined whether or not the content of the stop-of-use status register contains the stop of the core Cx (S15), and, if contained, the interface 14 or 15 used by the core Cx is blocked (the signal from the core Cx is ignored) (S16).

After being blocked, or if it is determined in step 15 that the stop of use of the core Cx is not contained, the external system controller 2 reads a status from the stop-of-use status register 32 (S17), and the stop-of-use determining unit 17 determines whether the hardware resource of which the use is stopped is degenerated or not (S18).

If degenerated, the degenerating process is completed (S19), and, whereas if not degenerated, it is recognized that an abnormal status occurs, with the result that a predetermined abnormality process is carried out (S20).

Figure 5:
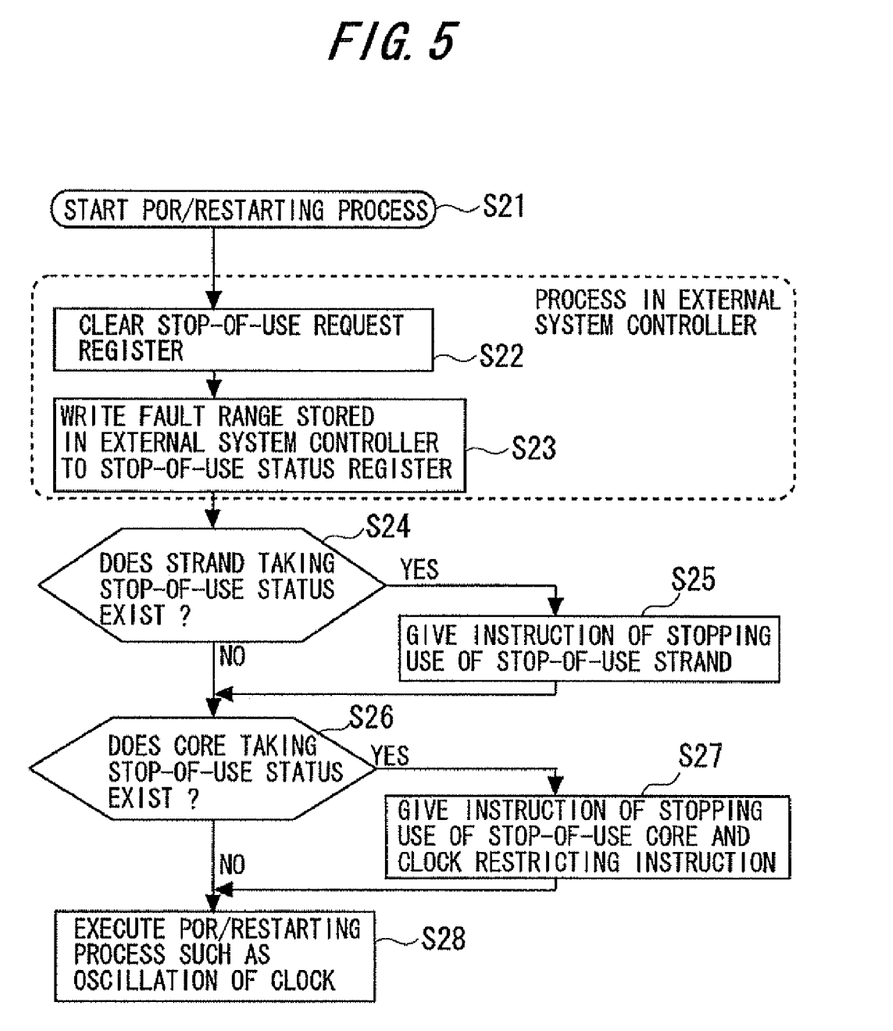
FIG. 5 is a diagram showing a flow of a POR/restarting process.

Further, FIG. 5 is a flowchart showing a process of restarting the present system.

Upon receiving an instruction of starting the POR or the restarting process (S21), the external system controller 2 clears the stop-of-use request register 33 (S22), and writes the fault range stored in the intra-processor memory to the stop-of-use status register 32 (S23).

Then, the stop-of-use determining unit 17 determines whether or not the content of the stop-of-use status register 32 contains the stop of use of the strand, and, if contained, gives an instruction of stopping the use of this strand (S25).

After giving the instruction, or if it is determined in step 25 that the stop of the use of the strand is not contained, the stop-of-use determining unit 17 determines whether or not the content of the stop-of-use status register 32 contains the stop of use of the core (S26), and, if contained, gives an instruction of stopping the use of the core and an instruction of restraining the clock (S27).

After giving the stop instruction, or if it is determined in step 26 that the stop of use of the core is not contained, the system 1 (processor 1) executes the POR or the restarting process such as supplying the clocks (S28).

Figure 7:
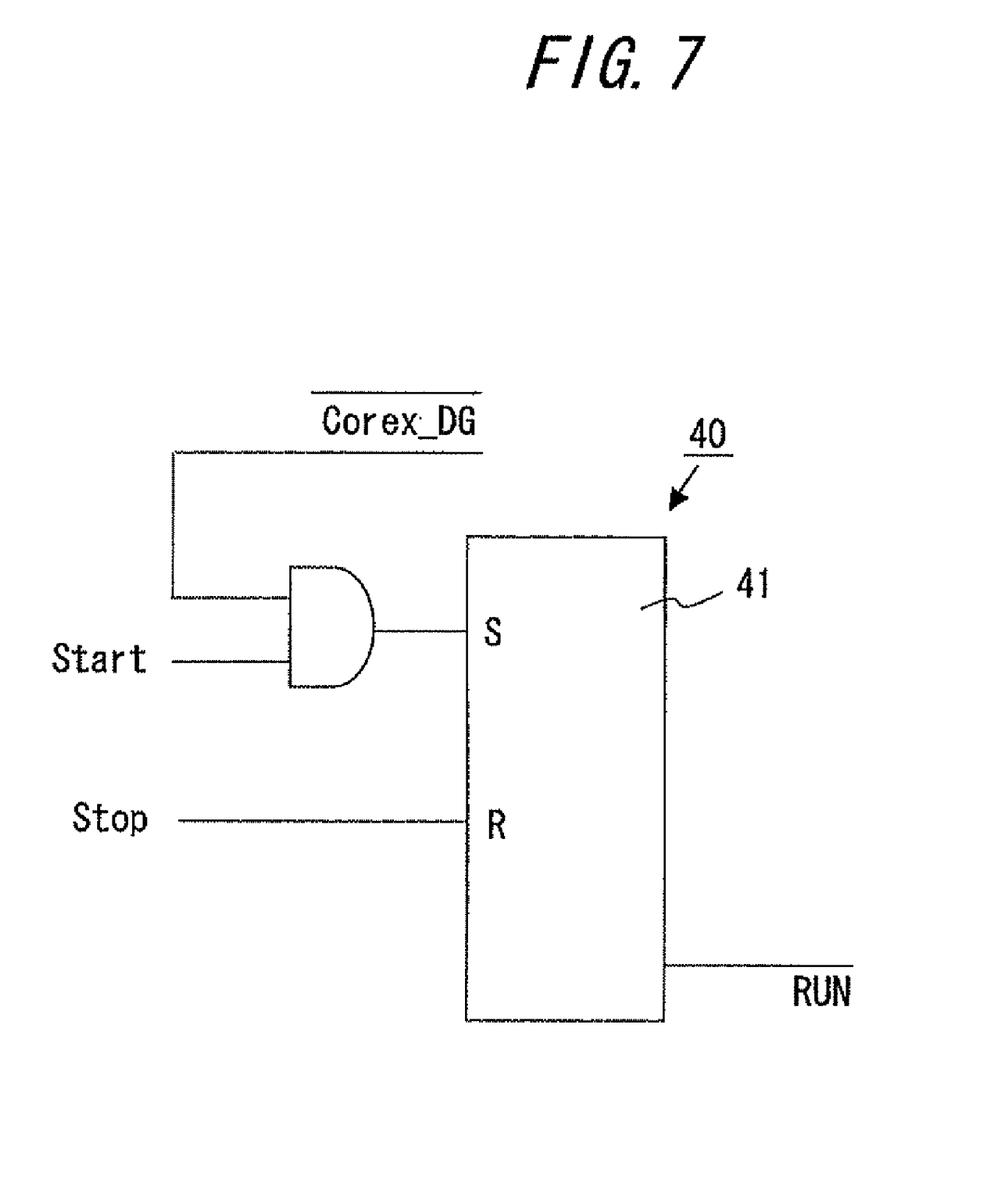
FIG. 7 is a schematic diagram of a stop determining unit in a clock supply unit.

FIG. 7 is a schematic diagram of a stop determining unit of a clock supply unit in the present system. As illustrated in FIG. 7, in a stop determining unit 40 of the clock supply unit, a signal obtained when inverting Corex_DG and a start signal are ANDed, the AND is inputted to a set terminal of a register 41, "1" is set in an output RUN when a value of AND is "1", and the clocks are supplied.

Moreover, when instructed to stop the core and if "1" is set in Corex_DG, the input to the set terminal becomes "0" irrespective of the start signal, and the clocks are stopped.

With this operation, according to the present system, when starting the clocks in the POR sequence, if all of the intra-core strands take the stop-of-use status in the stop-of-use status register 32, this shows the stop of use of the core concerned, and hence the stop-of-use core clocks remain stopped by canceling none of the clock stop signal for this core.

As discussed above, according to the present embodiment, only the core and the strand processing unit, which are restricted within the fault range by the information specifying the fault range and by the hardware stop-of-use means, can be stopped in their use without affecting other cores and strand processing units.

Further, the external system processor 2 is accessible to the fault range determining means notifying of the fault range within the processor and to the stop-of-use means stopping the use of the hardware resource, whereby the influence range can be surely specified and the use can be certainly stopped irrespective of the error status of the processor.

What is claimed is:

1. A processor, comprising:
a plurality of core units respectively including a plurality of strand units that execute instructions and a shared first unit shared by the plurality of strand units; and a shared second unit shared by the plurality of core units, the plurality of core units and the shared second unit being hardware resources;
the processor further comprising:
a fault-range determining unit that determines, as a fault range the hardware resources disabled from being used due to a fault, all of a range of the processor being the fault range when receiving notification indicating a fault of the shared second unit or all of the core units of the processor, determines a part of the core units being the fault range when receiving notification indicating a fault of the shared first unit included in the part of the core units or all of the strand units included in the part of the core units, and determines a part of the strand units being the fault range when receiving notification indicating a fault of the part of the strand units;
a stop-of-use unit that instructs the processor to stop using the hardware resources in the fault range on the basis of a result of the fault range determination; and
a clock-supply unit that stops, in a next startup process of the processor, clock supply to the fault range in the hardware resources in accordance with an instruction from the stop-of-use unit.

2. The processor according to claim 1, further comprising a unit that executes, when stopping the use of the hardware resources specified by the fault range, a predetermined process so as not to affect an instruction processing procedure in the hardware resources that are not in the fault range and thereafter stops the hardware resources.

3. The processor according to claim 2, wherein when a cache memory in a write-back system is included in the fault range, a process of writing a content of the cache memory to a cache memory in the hardware resources that are not in the fault range is executed as the predetermined process.

4. The processor according to claim 1, further comprising a stop information retaining unit that retains stop information specifying the hardware resources taking a stop-of-use status,
wherein the stop-of-use unit determines the hardware resource to be used afresh based on the stop information being retained in the stop information retaining unit and a newly-received fault range.

5. The processor according to claim 4, wherein the core unit defined as the hardware resource has the strand units defined as the hardware resources, and when a part of the strand units of the core unit is in the stop-of-use status and when the fault-range determining unit newly determines that all other parts of the strand units of the core unit fall within the fault range, the stop-of-use unit stops the core unit on the basis of the present stop information and the new fault range.

6. The processor according to claim 1, which is connected to an external controller, wherein the fault-range determining unit notifies the external controller of the fault range, and the stop-of-use unit receives the fault range from the external controller.

7. The processor according to claim 6, wherein the stop-of-use unit receives the fault range from the external controller when in a startup process of the processor, and stops the use of the hardware resources in the fault range.

8. The processor according to claim 1, wherein the hardware resources are cache memories,
when contents of the cache memories are inconsistent due to a fault, the fault-range determining unit determines all of the range of the processor to be the fault range, and the stop-of-use unit stops all of the hardware resources.

9. A processor control method by which a processor executes processing comprising:
the processor comprises a plurality of core units respectively including a plurality of strand units that execute instructions and a shared first unit shared by the plurality of strand units; and a shared second unit shared by the plurality of core units, the plurality of core units and the shared second unit being hardware resources;
determining, as a fault range the hardware resources disabled from being used due to a fault, all of a range of the processor being the fault range when receiving notification indicating a fault of the shared second unit or all of the core units of the processor, determining a part of the core units being the fault range when receiving notification indicating a fault of the shared first unit included in the part of the core units or all of the strand units included in the part of the core units, and determining a part of the strand units being the fault range when receiving notification indicating a fault of the part of the strand units;
instructing the processor to stop using the hardware resources in the fault range on the basis of a result of the fault range determination; and
stopping, in a next startup process of the processor, clock supply to the fault range in the hardware resources in accordance with an instruction from the instructing.

10. The processor control method according to claim 9, wherein when stopping the use of the hardware resources specified by the fault range, a predetermined process is executed so as not to affect an instruction processing procedure in the hardware resources that are not in the fault range, and thereafter the hardware resources are stopped.

11. The processor control method according to claim 10, wherein when a cache memory in a write-back system is included in the fault range, a process of writing a content of the cache memory to a cache memory existing in the hardware resources that are not in the fault range is executed as the predetermined process.

12. The processor control method according to claim 9, wherein the processor further comprises a stop information retaining unit that retains stop information specifying the hardware resources taking a stop-of-use status, and
the instructing determines the hardware resource to be used afresh based on the stop information being retained in the stop information retaining unit and a newly-received fault range.

13. The processor control method according to claim 12, wherein the core unit defined as the hardware resource has the strand units defined as the hardware resources, and when a part of the strand units of the core unit is in the stop-of-use status and when the determining newly determines that all other parts of the strand units of the core unit fall within the fault range, the instructing stops the core unit based on the present stop information and the new fault range.

14. The processor control method according to claim 9, wherein the processor is connected to an external controller, the determining notifies the external controller of the fault range, and the instructing receives the fault range from the external controller.

15. The processor control method according to claim 14, wherein the instructing receives the fault range from the external controller when in a startup process of the processor, and stops the use of the hardware resources in the fault range.

16. The processor control method according to claim 9, wherein the hardware resources are cache memories, when contents of the cache memories are inconsistent due to a fault, the determining determines all of the range of the processor to be the fault range, and the instructing stops all of the hardware resources.

17. A non-transitory computer readable medium, which is recorded with a control program that causes a processor to execute processing comprising:

the processor comprises a plurality of core units respectively including a plurality of strand units that execute instructions and a shared first unit shared by the plurality of strand units; and a shared second unit shared by the plurality of core units, the plurality of core units and the shared second unit being hardware resources;

determining, as a fault range the hardware resources disabled from being used due to a fault, all of a range of the processor being the fault range when receiving notification indicating a fault of the shared second unit or all of the core units of the processor, determining a part of the core units being the fault range when receiving notification indicating a fault of the shared first unit included in the part of the core units or all of the strand units included in the part of the core units, and determining a part of the strand units being the fault range when receiving notification indicating a fault of the part of the strand units;

instructing the processor to stop using the hardware resources in the fault range on the basis of a result of the fault range determination; and stopping, in a next startup process of the processor, clock supply to the fault range in the hardware resources in accordance with an instruction from the instructing.

* * * * *